United States Patent [19]
Tidwell, II

[11] Patent Number: 5,859,637
[45] Date of Patent: Jan. 12, 1999

[54] NON-PROGRAMMING METHOD AND APPARATUS FOR CREATING WIZARDS WITH A SCRIPT

[75] Inventor: Leonard Douglas Tidwell, II, Raleigh, N.C.

[73] Assignee: International Business Machines Corporation, Armonk, N.Y.

[21] Appl. No.: 800,002

[22] Filed: Feb. 13, 1997

[51] Int. Cl.⁶ .................................................. G06F 3/00
[52] U.S. Cl. ............................................ 345/336; 345/333
[58] Field of Search ................................. 345/326–350; 434/118; 395/682

[56] References Cited

U.S. PATENT DOCUMENTS

| | | | |
|---|---|---|---|
| 4,648,062 | 3/1987 | Johnson et al. ......................... | 345/338 |
| 5,029,113 | 7/1991 | Miyoshi et al. ........................ | 345/336 |
| 5,301,326 | 4/1994 | Linnett et al. .......................... | 395/682 |
| 5,388,993 | 2/1995 | McKiel et al. ...................... | 345/388 X |
| 5,434,965 | 7/1995 | Matheny et al. ........................ | 345/338 |
| 5,513,308 | 4/1996 | Mori ......................................... | 345/337 |
| 5,535,422 | 7/1996 | Chiang et al. .......................... | 345/338 |
| 5,550,967 | 8/1996 | Brewer et al. .......................... | 345/338 |
| 5,581,684 | 12/1996 | Dudzik et al. .......................... | 345/338 |
| 5,602,982 | 2/1997 | Judd et al. .......................... | 345/336 X |
| 5,627,958 | 5/1997 | Potts et al. .............................. | 345/336 |
| 5,727,950 | 3/1998 | Cook et al. .......................... | 345/336 X |

*Primary Examiner*—John E. Breene
*Attorney, Agent, or Firm*—Jeanine S. Ray-Yarletts

[57] ABSTRACT

A method and apparatus are provided whereby a person not familiar with programming or programming languages can create a wizard to interface between an application program and the user to guide the user through the interaction with the application program. This allows non-programmers to create intuitive and sensible user interfaces without the requirement of learning how to write software.

8 Claims, 7 Drawing Sheets

NON-PROGRAMMING METHOD AND APPARATUS FOR CREATING WIZARDS WITH A SCRIPT

BACKGROUND OF THE INVENTION

With the use of personal computers becoming pervasive throughout society, a need has arisen to allow those who have not been specifically trained in computers to enter, develop and maintain information without requiring a significant amount of training. Many solutions have been proposed to this problem.

Help systems such as balloon help, which will create a bubble with context sensitive helpful information when a particular key sequence is entered, and hover help, which also provide pop-up, context sensitive help when the cursor remains over an active field for a certain period of time became popular to assist an untrained or novice user in performing such tasks. While these help systems are a significant improvement over the legacy methods of providing assistance such as providing hard copy documentation or providing a link to online books, they still can be voluminous and do not guide the user through the task which they are attempting to complete.

Another approach to solving the problem of assisting untrained users is the tutorial approach. Before a user attempts to complete an unfamiliar task, they are asked to complete a tutorial which will take them through the steps which they are about to perform. This allows the user to actually see what the panels are and understand a sample of the task to be performed, but it does not assist them when they become confused part way through their execution of the task.

There are several additional solutions to the problem of designing easy to use interfaces to guide users through application programs, three of them are coaches, cue cards and agents.

Coaches are programs that guide a user through an existing interface, teaching the user how to do a task with a particular product. A coach teaches the user how to use a products interface, guiding you from one step to the next and protecting you from making mistakes. An example of this is that a coach might disable every menu item except one, drawing a box around the one enabled menu item that the user should chose. Coaches are different than cue cards in that coaches are more than information. They provide application logic to guide the user through the task.

Cue cards are small help panels that appear along side an existing interface, teaching the user how to do a task with a particular product. Cue cards differ from coaches in that they are informational only; they tell the user what to do but don't guide or restrict the user in any way. It leaves the responsibility to the user to read the information in the cue card and apply that information to the task.

Agents, in the present sense, are autonomous pieces of code that perform a task for the user. Agents typically work in the background and have very little user interface. They are designed to do something without interaction from the user and are typically executed automatically when a predetermined event occurs or a predetermined condition becomes true.

The newest approach to this problem is the creation of wizards. Wizards are interfaces designed to do tasks for users. They are different from the prior art in that they are not necessarily meant to teach or instruct. Wizards are meant to simplify the user interface. Wizards reside between the user and an application program and guide the user through tasks. Examples of this are, for instance, a wizard that allows a form to have pop-up options for each of the fields to be entered. Another example is the Rapid Test product from Mercury Interactive Corp. which uses a plan wizard, a script wizard and a cycle wizard to provide a self-guided visual interface for specifying test requirements and test cases. Wizards were first divulged in a patent assigned to Microsoft Corporation entitled 'Method and System for Controlling the Execution of an Application Program', U.S. Pat. No. 5,301,326.

Wizards are traditionally written in programming languages such as C or C++. Since the wizards are written in programming languages, they require programmers to write them. There is a need in the industry for an intuitive means of creating a wizard without requiring a programmer, a means for creating a wizard that is easy to understand so that a person familiar with the user interface of the application program can easily write a wizard for executing that application program. This would significantly reduce the training costs for those who create user front-ends for application programs.

OBJECTS OF THE INVENTION

It is an object of the invention to present an intuitive, easy to use method of creating wizards such that a person familiar with the user interface of the application program and able to understand a finite set of English-like commands is able to create the wizard using this predetermined set of commands.

It is another object of the invention that the predetermined set of commands is portable across operating systems and programming environments.

It is yet another object of the present invention to enable users to modify a wizard without requiring that the wizard be recompiled and relinked.

It is yet another object of the present invention to enable wizard creating to be intuitive such that a user can customize the wizard without requiring the assistance of a programmer.

It is yet another object of the present invention to enable programmers to use the wizards while still enabling exit routines that allow the programmer to provide additional function.

These and other objectives are met by the present invention.

SUMMARY OF THE INVENTION

The present invention is a method for creating wizards using a script-like language that supports a predetermined set of commands. The commands are defined by a driver called the SmartGuide driver. The wizards, or SmartGuides as they are called when implemented using the script-like means of the present invention, are designed to do a task for the user with as little interaction with the user as necessary. They provide an uncomplicated user interface for the user rather than attempting to educate the user as much of the prior art does. The SmartGuides of the present invention provide a unique user interface to the user, they do not attempt to manipulate the underlying application program's user interface.

The simplicity of the SmartGuides of the present invention allow the user to customize the SmartGuide for their particular application without any tools other than a standard text editor such as Lotus' AmiPro or Microsoft's Word. This is accomplished by modifying the commands contained in the SmartGuide Script.

DETAILED DESCRIPTION OF THE PREFERRED EMBODIMENT

The present invention has been implemented in a script-like language containing a fixed number of commands that create the user interface whereby the user interacts with the application program, or, alternatively directly with the operating system. The present invention is clearly distinguished in that the SmartGuide driver allows users without a programming background create professional quality wizards without learning to write computer applications. The SmartGuide driver is specific to the operating system upon which the Application Program is running but the interface between the different SmartGuide Drivers and the SmartGuide Scripts remains constant.

Figure 1:
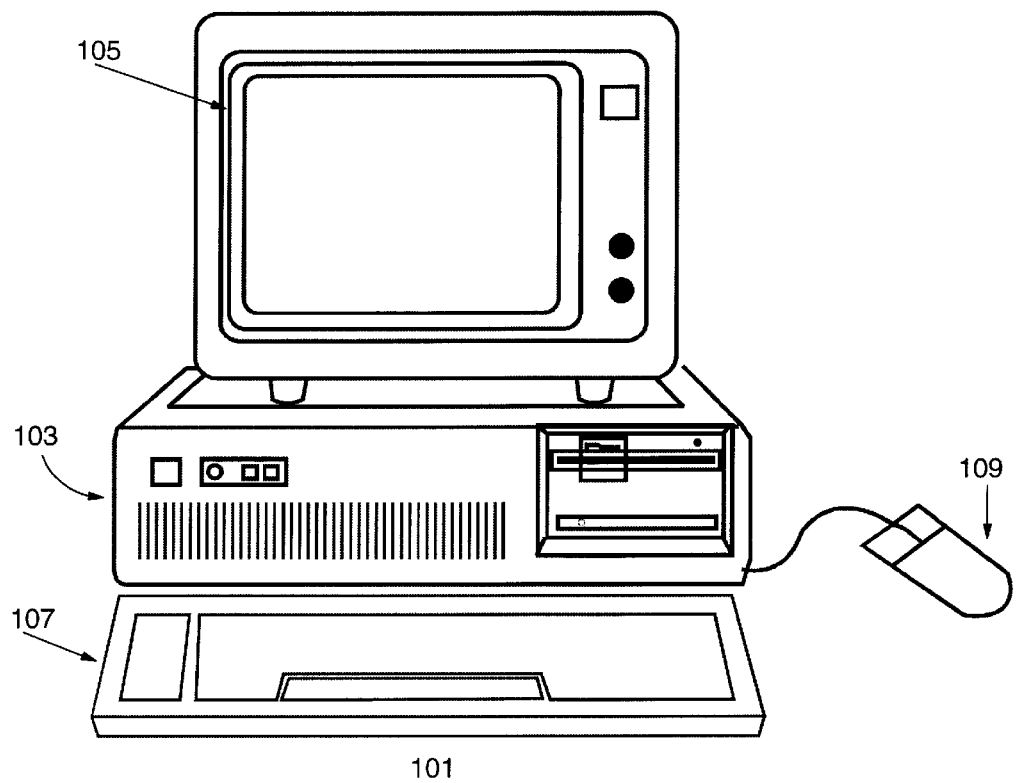
FIG. 1 is a system in which the SmartGuide can be implemented.

FIG. 1 depicts a system in which the SmartGuide of the present invention may be implemented. FIG. 1 depicts a personal computer containing a system unit (103), a monitor (105), a keyboard (107) and a mouse (109). The system unit (103) includes memory means and processing means. This is not meant to limit the implementation of SmartGuides to a particular system. SmartGuides can be implemented in any computer system containing a display device, a processor and an input device.

Figure 2:
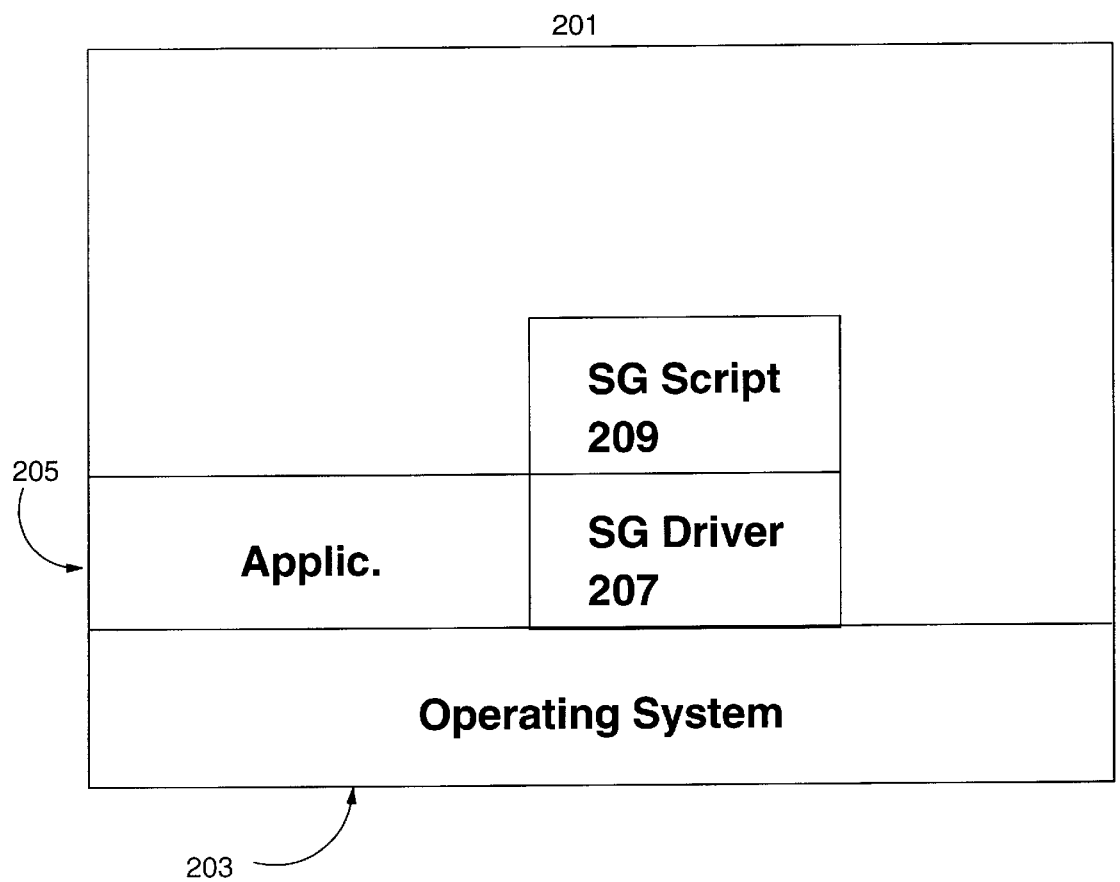
FIG. 2 is a representation of the interaction between the SmartGuide script, the SmartGuide driver, the application program and the operating system.

FIG. 2 is a graphical representation of the interaction within the memory means of the system unit (103). The memory (201) of the system unit (103) first has an operating system (203) executing within it. The operating system (203) is necessary for the computer to function. On top of the operating system (203), application programs (205) execute. Application programs (205) interact with the operating system (203) to accomplish pieces of work. In a system using the present invention, a SmartGuide Driver (207) executes on top of the operating system (203) and interacts with the application program (205) to provide an interface to the application program (205). SmartGuide scripts (209) are then created which execute in the memory (201) and provide commands to the SmartGuide Driver (207) which converts those commands to information understandable to the application program (205). The SmartGuide Driver (207) then instructs the application program (205) on what action is to be taken. Any information returned from the application program (205) is returned to the SmartGuide driver (207) which presents the information to the user.

Figure 3:
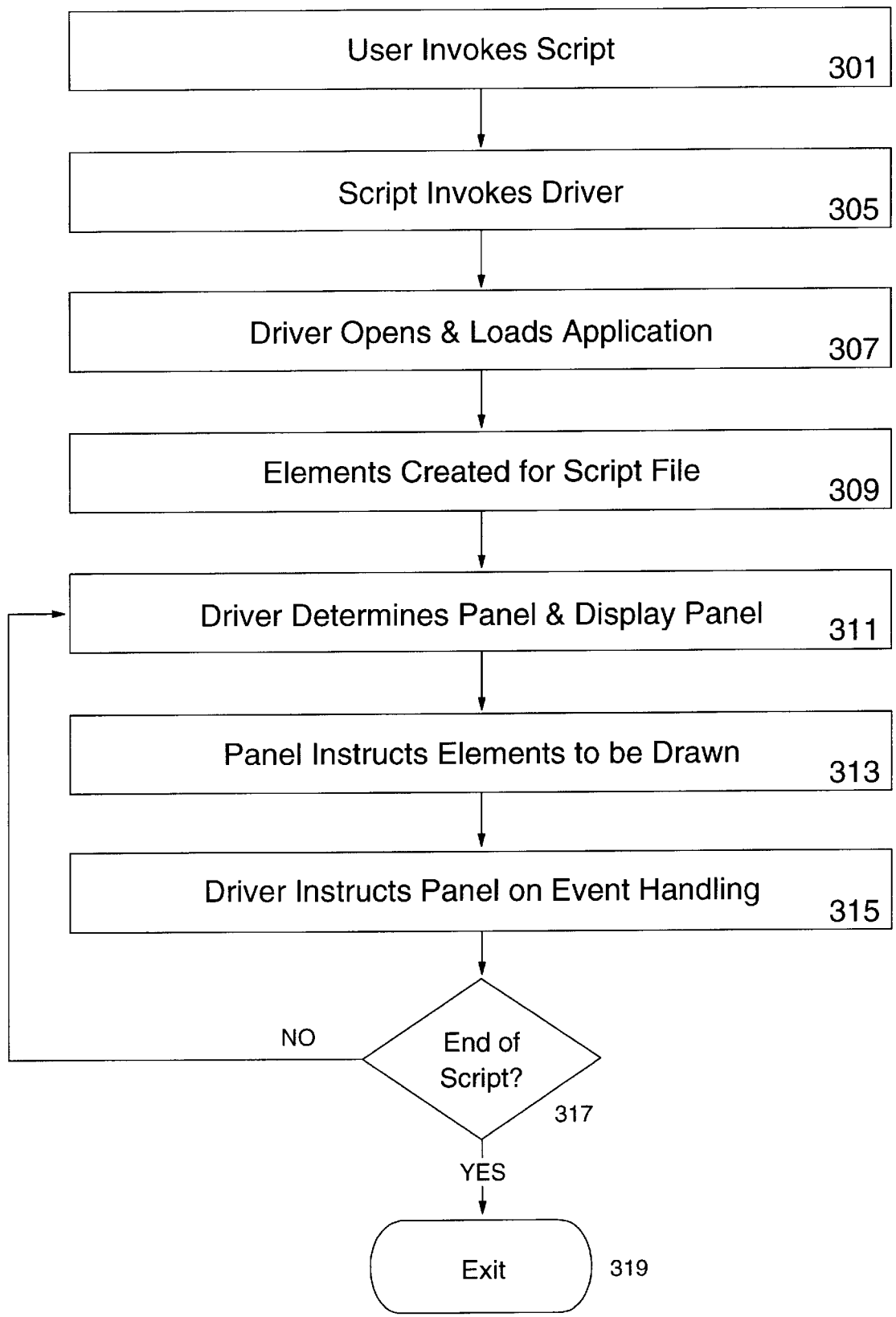
FIG. 3 is a flow chart of the logic contained within the SmartGuide.

FIG. 3 is a flow chart of the logic taken when invoking a SmartGuide. First the user invokes a SmartGuide script (301). When the SmartGuide script is invoked, this triggers the invocation of a SmartGuide driver (305). The SmartGuide driver opens and loads the associated application program file (307). Once the application program file is loaded, the elements defined in the script file are created (309). Next the SmartGuide driver determines what the presentation for the panels should be and presents the panels (311). The panel initiates the drawing of the elements (313) within the panel. The driver then instructs the panel on how each of the events should be handled (315). A test is then made to determine if the end of the script has been encountered (317). If the end of the script has not been encountered then control returns to the SmartGuide driver determining the appropriate panels and displaying them (311). If the end of the script has been reached, or another exit condition exists, control exits from the SmartGuide (319).

An example of a SmartGuide script is as follows:

<sguide enable-cancel image-lib=sgpatent image-id=100>
<title>Sample SmartGuide Script
<panel name=main next=example2>
<title>First Panel
<p>This is a panel with <b>basic</b>controls only. Here's an entry field:
<dataentry name=ex1>
<p>Click Next to continue.
</panel>
<panel name=example2 back=main next=example3>
<title>Penultimate Panel
<p>This entry field contains the data you just entered:
<dataentry name=ex1>
<p>In addition, we'll demonstrate some radio buttons. Choose one of the following options:
<option name=ex2>
<select>Chocolate
<select>Vanilla
<select>Strawberry
</option>
</panel>
<panel name=example3 back=example2>
<title>Our Sample Script is Done!
<p>This is the last panel in our sample script. Notice that your favorite flavor of ice cream is displayed in the following entry field:
<dataentry name=ex2>
</panel>
</sguide>

Figure 4A:
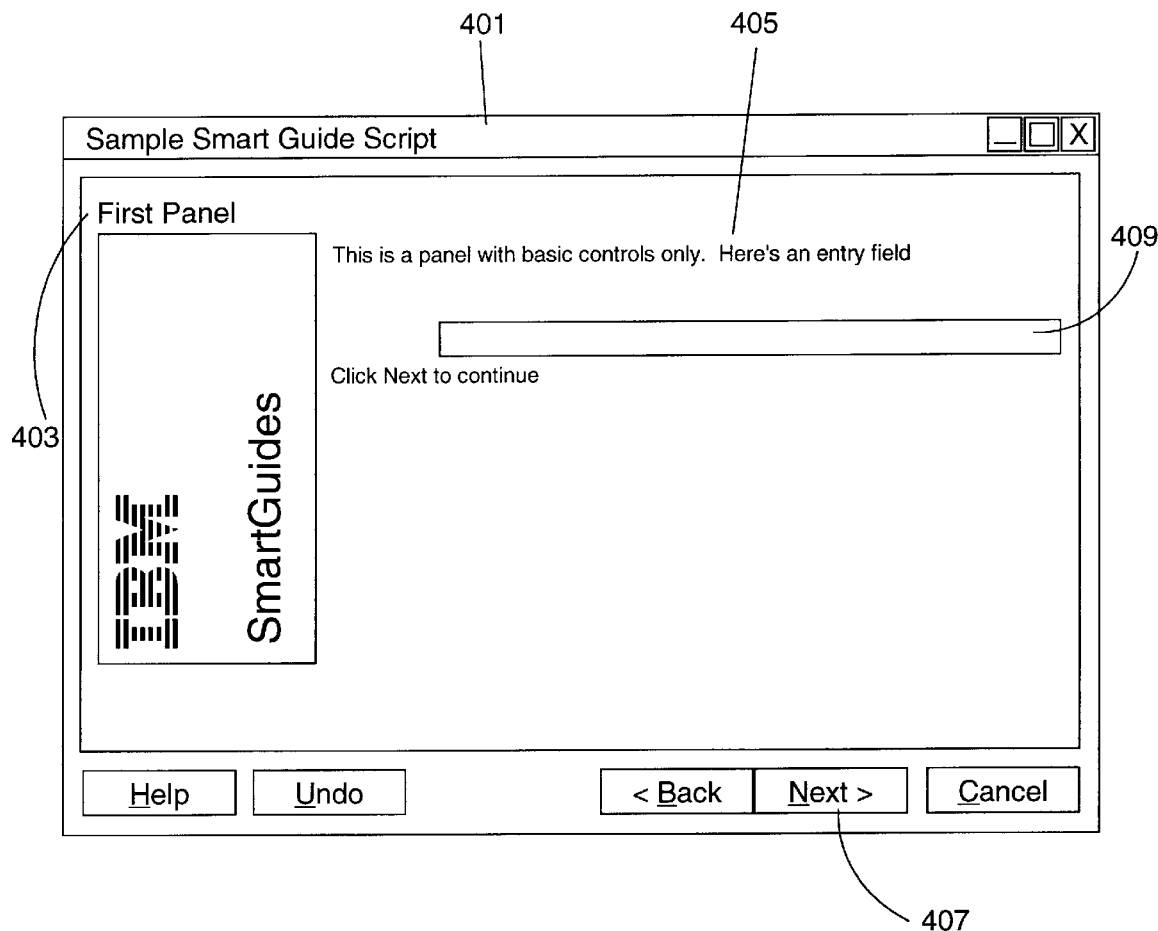
FIG. 4A, 4B and 4C are examples of the user interface presented by the SmartGuide of the present invention.

FIG. 4A represents the first panel created by the sample script. The <panel name=main next=example2> provides a means of linking to this page by name and a reference to any previous or subsequent pages. Since there are no previous pages, there is no 'back' parameter. The <title> command places the words following it in the title bar at upper left hand corner of the screen (401). The 'panel' command links the panels for maneuvering forward and backwards and enables the buttons at the bottom of the page (407). The secondary <title> command places the words following it on the upper left corner of the panel itself (403). The <p> indicators are for script text that is to appear on the panel (405) using intuitive tags such as <b> for bold or <u> for underline. The <dataentry> fields create boxes for the user to enter input to the application (409). The </panel> command indicates the end of the present panel definition.

Figure 4B:
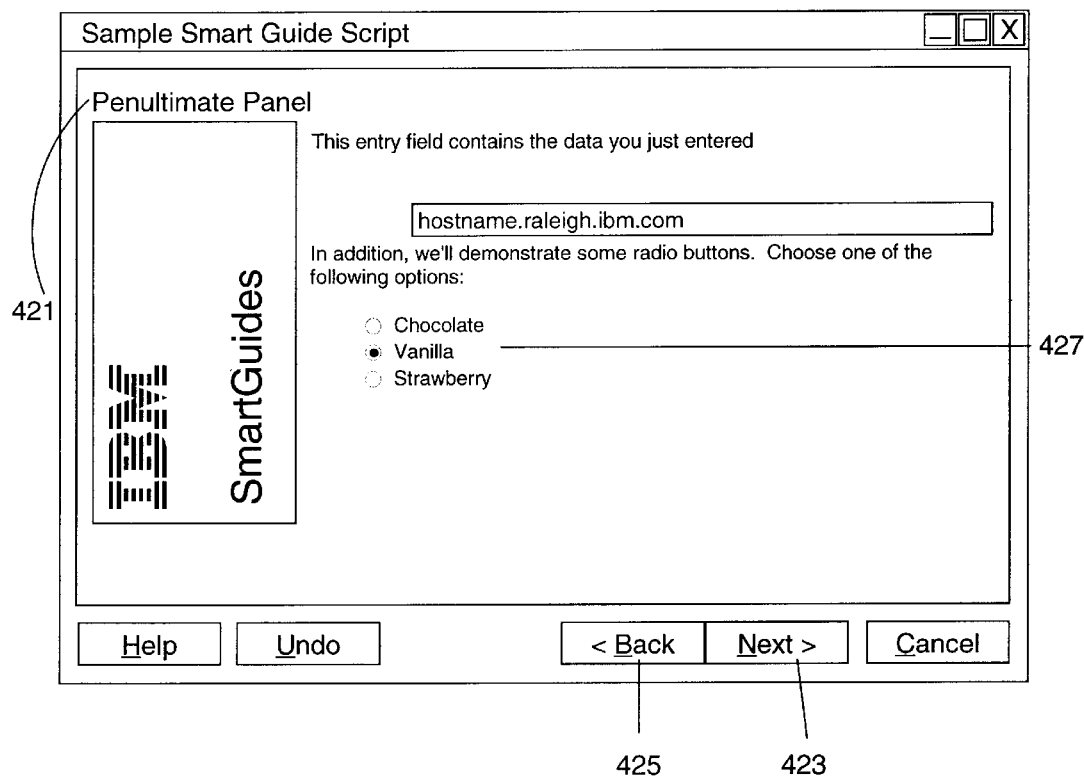

FIG. 4B represents the second panel created by the sample script. The panel command in the example indicates that a new panel is to be created. The <panel name=example2 back=main next=example3> command activates the Next button (423) on the presentation panel and directs it to maneuver to the page named example3 while also activating the Back button (425) on the presentation panel to maneuver to the page named main. The <p> fields and <dataentry> fields act as they did in the previous page. In addition, a set of option buttons (427) are presented using the <option> and <select> commands.

Figure 4C:
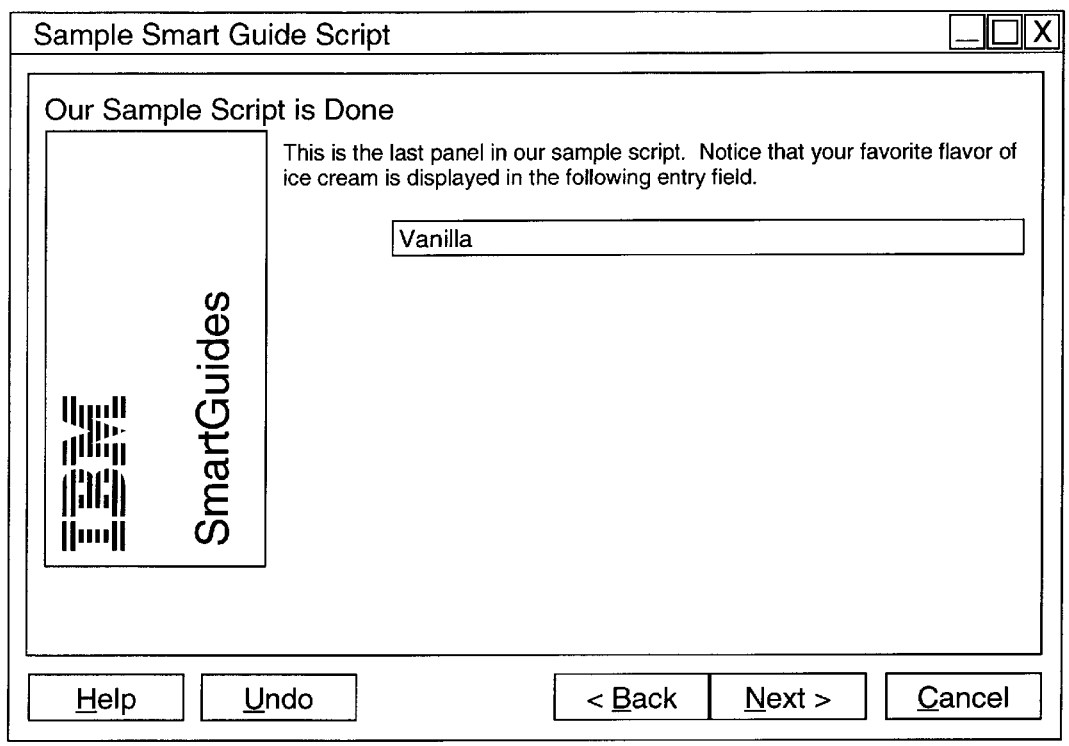

FIG. 4C is a panel which presents the results of the information input to the SmartGuide by the user. It uses the same tags and commands at the prior two pages. At the end of the task to be performed an </sguide> is inserted to indicate that the last panel has been completed for the task.

Figure 5:
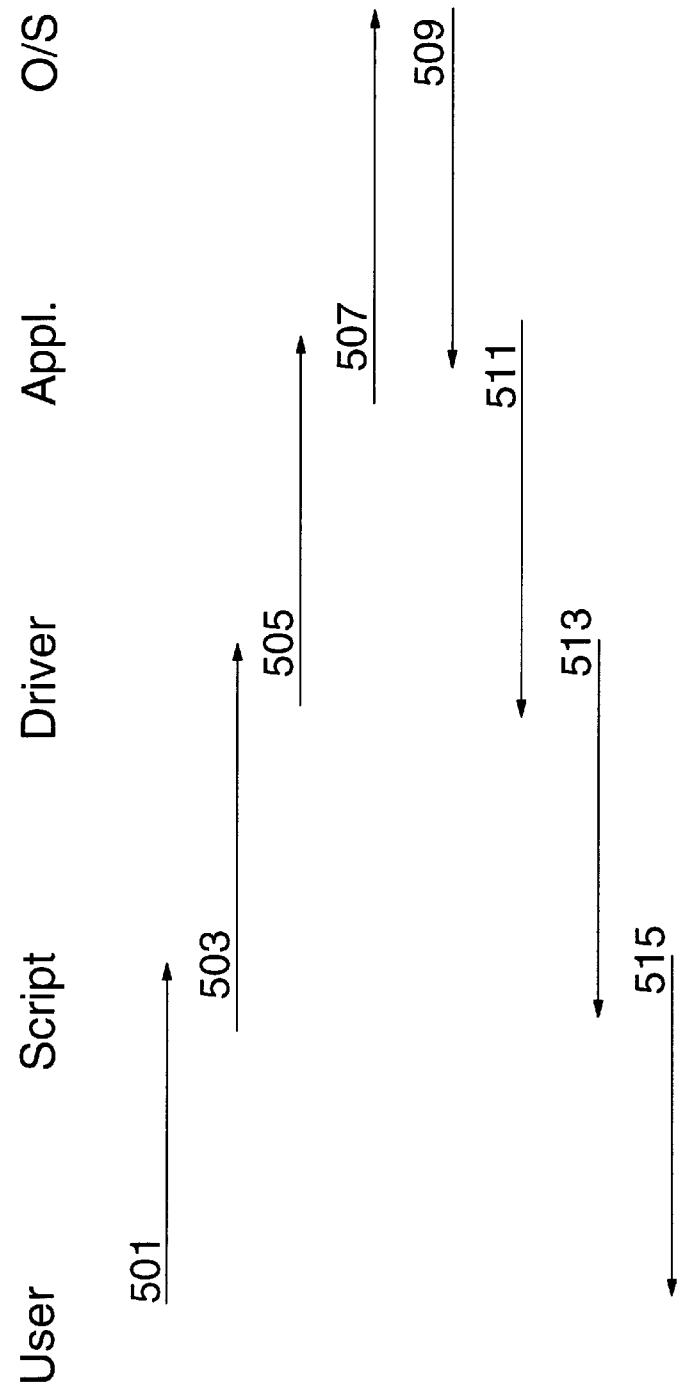
FIG. 5 is a representation of the flow of control as the user utilizes a SmartGuide.

FIG. 5 is a basic flow diagram of the control as it passes between the user and the application program. First, the user invokes the SmartGuide Script (501), the SmartGuide Script is then interpreted which invokes the SmartGuide Driver (503). The SmartGuide Driver, with the parameters passed by the SmartGuide Script, invokes the Application Program (505). The Application Program then interacts with the Operating System (507) to receive necessary system services and support. The Operating System (509) returns information to the Application Program, which in turn performs actions and passes information back to the SmartGuide Driver (511). The SmartGuide Driver consults the SmartGuide Script (513) and instructs the SmartGuide Script to present the appropriate information to the User (515).

What is claimed is:

1. A method in a computer system for enabling a user to perform a task by a SmartGuide providing direction to an application program, the application program receiving commands from the SmartGuide to execute specific tasks, the method including the steps of:

invoking a SmartGuide Script, said SmartGuide Script created using a discrete number of English-readable commands to present information to the user;

said SmartGuide Script instantiating a SmartGuide Driver for interacting with said application program;

said SmartGuide Driver presenting a graphical user interface to the user based on instructions within the SmartGuide Script;

the SmartGuide Driver invoking the application program by converting the discrete number of English-readable commands to a programmed command;

said SmartGuide Driver, receiving instruction from said SmartGuide Script, passing information within the programmed command to the application program for instructing the application program on proceeding; and, the SmartGuide providing responses to the user for completion of the task.

2. A method as in claim 1 wherein said SmartGuide Script is portable across multiple operating systems.

3. A method as in claim 1 wherein said user can modify said SmartGuide Script using a conventional editor.

4. A method as in claim 1 wherein a programmed exit routine interacts with said SmartGuide Driver to transfer information to said application program.

5. A computer system having one or more processors, a display device supporting a graphical user interface and one or more input devices comprising:

one or more application programs designed to complete predetermined tasks;

one or more SmartGuides, said SmartGuides providing an interface between a user and the one or more applications programs, said SmartGuides comprising a programmed SmartGuide Driver and a SmartGuide Script interpreted by said SmartGuide Driver;

programmable means for said SmartGuides to prompt said user for input;

programmable means responsive to said user input for said SmartGuides to transform said user input into information usable by said applications program;

programmable means for transferring said information to said applications program from said SmartGuides;

programmable means for enabling feedback to said SmartGuides from said applications program; and, means for said SmartGuide to transform said received information into a user readable format and presents said information to said user;

wherein said one or more SmartGuide Scripts comprise a discrete, predefined set of human-readable commands to instruct said wizards.

6. A computer system as in claim 5 wherein said SmartGuide Script is portable across multiple operating systems.

7. A computer system as in claim 5 wherein said user can modify said SmartGuide Script using a text editor.

8. A computer system as in claim 5 wherein a programmed exit routine interacts with said SmartGuide Driver and transfers information to said application program.

* * * * *